Figure 1:
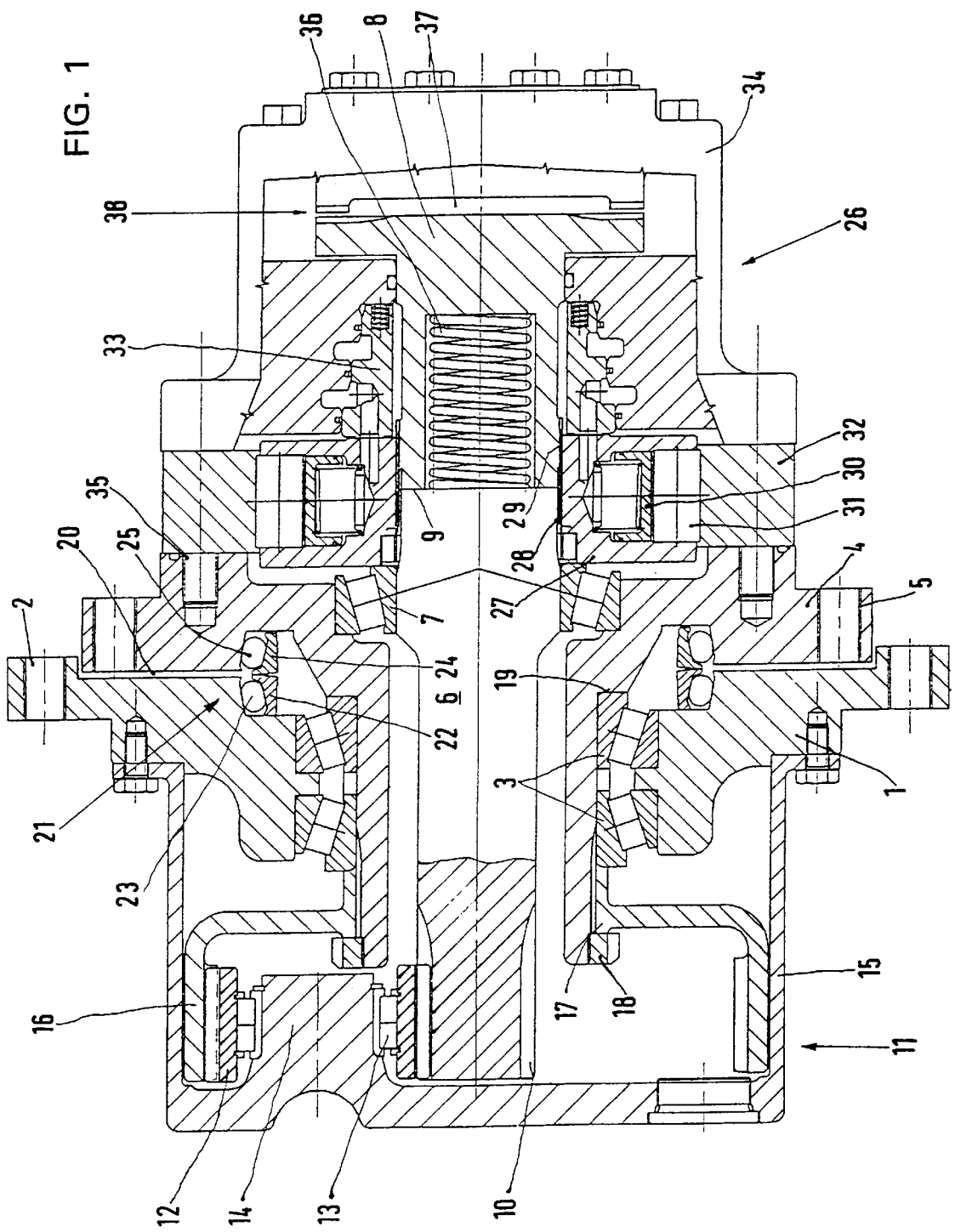

United States Patent [19]
Mann

[11] Patent Number: 5,820,506
[45] Date of Patent: Oct. 13, 1998

[54] WHEEL DRIVE FOR TRACKED VEHICLES

[75] Inventor: Egon Mann, Friedrichshafen, Germany

[73] Assignee: ZF Friedrichshafen AG, Friedrichshafen, Germany

[21] Appl. No.: 875,196

[22] PCT Filed: Jan. 27, 1996

[86] PCT No.: PCT/EP96/00331

§ 371 Date: Jul. 18, 1997

§ 102(e) Date: Jul. 18, 1997

[87] PCT Pub. No.: WO96/23670

PCT Pub. Date: Aug. 19, 1996

[30] Foreign Application Priority Data

Feb. 3, 1995 [DE] Germany ................. 195 03 477.5

[51] Int. Cl.$^6$ .................. B60K 7/00; B60K 17/04
[52] U.S. Cl. .................................................. 475/83
[58] Field of Search ............................ 475/83; 180/308

[56] References Cited

U.S. PATENT DOCUMENTS

| | | | |
|---|---|---|---|
| 2,155,198 | 4/1939 | Lawrence | 475/83 |
| 3,749,195 | 7/1973 | Vegners | 180/308 |
| 3,770,075 | 11/1973 | Vegners | 180/308 |
| 3,865,207 | 2/1975 | Schwab et al. | 180/308 |
| 4,040,312 | 8/1977 | Tappan et al. | 475/83 |
| 4,171,732 | 10/1979 | Pinson | 180/308 |
| 4,271,725 | 6/1981 | Takao et al. | |
| 4,649,772 | 3/1987 | Daniel et al. | |
| 4,700,613 | 10/1987 | Tiljander | 180/308 |

FOREIGN PATENT DOCUMENTS

| | | |
|---|---|---|
| 0 505 727 A1 | 9/1992 | European Pat. Off. |
| 21 49 112 | 4/1972 | Germany |
| 22 55 239 | 11/1972 | Germany |
| 15 28 519 | 6/1975 | Germany |
| 27 44 936 | 4/1979 | Germany |
| 28 31 458 | 1/1980 | Germany |
| 42 06 086 A1 | 9/1983 | Germany |
| 42 35 697 A1 | 3/1994 | Germany |
| 1 370 664 | 10/1974 | United Kingdom |

*Primary Examiner*—Dirk Wright
*Attorney, Agent, or Firm*—Davis and Bujold

[57] ABSTRACT

A wheel drive for working machines, in particular tracked vehicles. A drive shaft (6) connects a hydraulic motor (26), which is in the form of a slow-running radial piston engine, to a planetary gear (11, 40). The hydraulic motor (26) is disposed on one side of a hub carrier (4) and the planetary gear (11, 40) and a hub (1) are disposed on the other side. A sliding ring seal (21) is arranged between the hub carrier (4) and the hub (1).

5 Claims, 2 Drawing Sheets

WHEEL DRIVE FOR TRACKED VEHICLES

The invention concerns a drive device for working machines, in particular for tracked vehicles such as bulldozers or the like.

Multiple developments of a tumbler drive are to be regarded as known from the prior art. In said drive devices, a hydraulic motor drives a chain gear via a planetary gear. The drive device should have small dimensions, especially in axial directions, so as not to project over the width of a chain tractor, such as a crawler excavator. The planetary gear must have a sufficiently great ratio in order to obtain a low speed level on the chain gear. The drive device must be provided with a brake to firmly brake the output during still stand of the hydraulic motor. Since the drive device is used even under extreme external conditions, provision must be made for a reliable seal over a long service life. Finally, the drive device must be easy to assemble and to maintain. Considering the production costs, the number of parts of the drive device must be as small as possible.

The above mentioned requirements are not met by the known drive devices. When the hydraulic motor is designed as an axial piston machine with a helical-disc construction, for example, an axially short design can be obtained only when said axial piston machine is integrated in the hub carrier. Examples of this are found in DE-A 27 44 936, DE-A 28 31 458 and DE-A 42 35 697. As a rule, the speeds of the hydraulic motor are so high that a multi-stage planetary gear has to be used. This multi-stage condition generally increases the axial length of the drive device so that the advantage obtained with the integration of the hydraulic motor in the hub carrier hydraulic motor integrated in the hub carrier is that bearings of large dimensions must be used for supporting the hub upon the hub carrier. To this disadvantage is added another: since the hub must be sealed relative to the hub carrier, seals with equally large diameters are needed. These circumstances result in a cost increase. In addition, the service life of the seal suffers by the relatively high peripheral speeds.

Although radial piston engines have long been known to the expert (see, for example DE-A 15 28 519 and DE-A 22 55 239), until today they have not been used in combination with a brake and a planetary gear as a tumbler drive for tracked vehicles.

The problem, on which this invention is based, is to provide a drive device for use in tracked vehicles which, in particular, stands out by a design that is of moderate cost, compact, simple to assemble and reliable.

The problem, on which the invention is based, is solved by a drive device having the characteristics stated in the main claim.

Compared to the tumbler drives known already, the solution according to the invention is surprisingly an extraordinarily simple design. The slow running radial piston engine works at a speed level which does not make necessary any multi-stage planetary gear. In addition, this engine, conditioned by the system, consists of relatively few parts. It is designed compactly, in an axial direction, so that it can be directly mounted upon one side of the hub carrier. A drive shaft connects the cylinder block of the radial piston engine with the planetary gear, the output member of which is non-rotatably connected with the hub.

Advantageous developments of the drive device, according to the invention, can be understood from claims 2 to 5.

Figure 2:
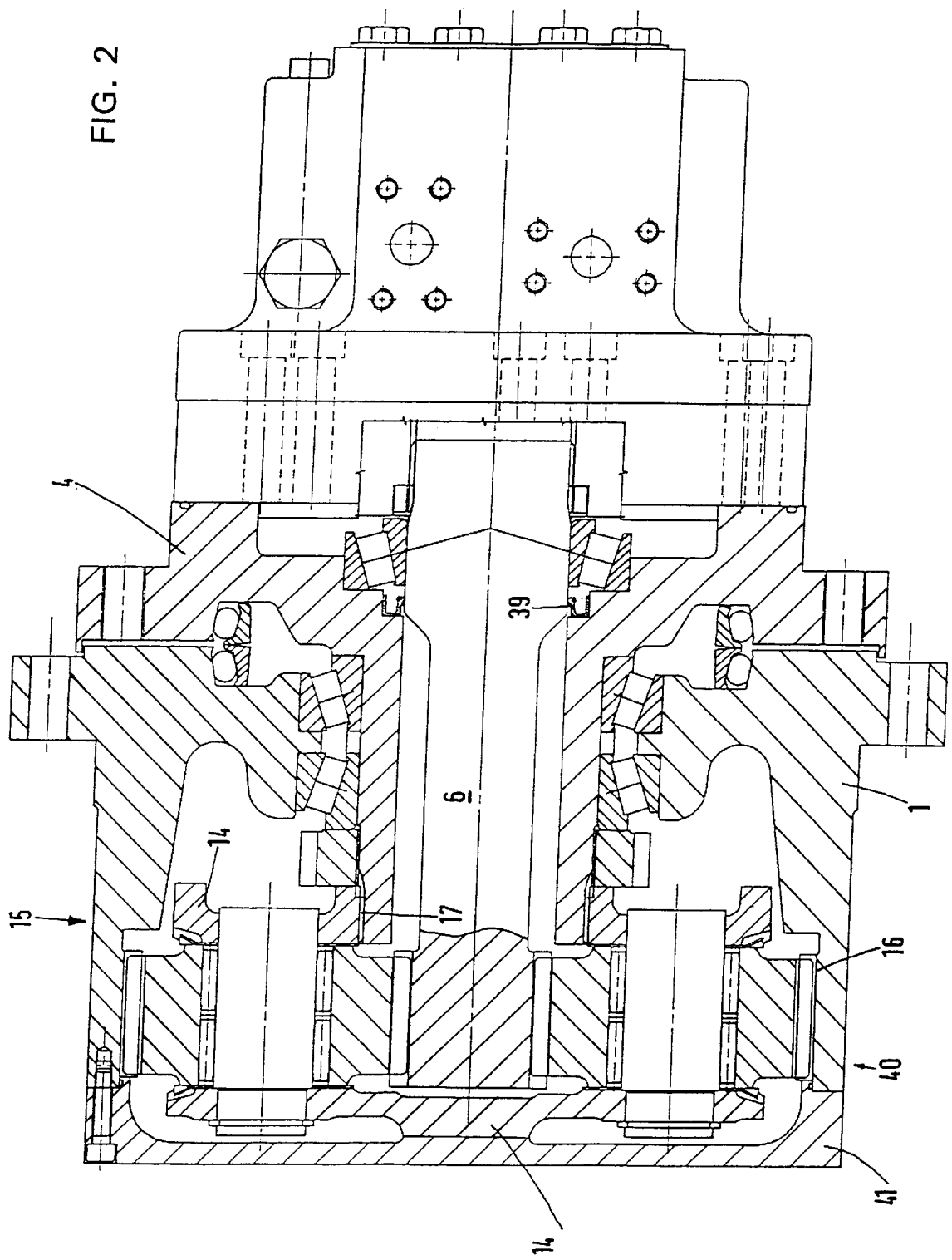

Other features essential to the invention, and the advantages resulting therefrom, are to be understood from the explanation of two embodiments that follows. In the drawings:

FIG. 1 shows, in a simplified representation, a first embodiment of a drive device, in particular for a tracked vehicle; and FIG. 2 shows another embodiment which differs, in particular, from the arrangement of FIG. 1 by the structure of the end output.

The drive device reproduced in FIG. 1 in a longitudinal section and a simplified representation, is especially adequate for the drive of a chain gear of a tracked vehicle such as a bulldozer or the like. It is a drive device which is also familiar by the designation of a tumbler drive.

A chain gear, itself not reproduced, is non-rotatably connected with a rotatingly disposed hub 1. For the non-rotatable connection, the hub 1 has a multiplicity of bolt holes 2, on its periphery, which accommodate stud bolts, likewise not shown, of the chain gear.

The hub 1 is rotatably situated upon a stationary hub carrier 4 via two taper roller bearings 3. The taper roller bearings are assembled in an 0 arrangement. The hub carrier 4 is firmly connected with the vehicle chassis which cannot be understood in detail from the drawing, but is familiar to the expert. Several bolt holes 5 are distributed on the periphery of the hub carrier 4 for the firm connection of the hub carrier 4 with the vehicle chassis.

In the stationarily disposed hub carrier 4, a drive shaft 6 is non-rotatably supported via a single bearing, especially a taper roller bearing 7. A connecting shaft 8 joins up with the drive shaft 6. The numeral 9 marks the separation between the drive shaft 6 and the connecting shaft 8.

The drive shaft 6, floatingly supported on one side, is non-rotatably connected at its free end-lying to the left in the drawing-with an internal central gear 10 (sun) of a planetary gear 11. The internal central gear 10 can be made integral with the drive shaft 6, as in the present case. The internal central gear 10 is in constant teeth meshing with planetary gears 12 of which one is reproduced. The planetary gears 12 are rotatably supported via anti-friction bearings 13 upon one web 14 of the planetary gear 11. The web 14 is an additional component part of an end output housing 15 which is snugly and firmly bolted with the hub 1 and surrounds the planetary gear 11.

In addition, the planetary gears 12 are in constant teeth meshing with a stationary external central gear 16 (hollow gear) of the planetary gear 11. The external central gear 16 is non-rotatably slipped on the hub carrier 4 in the area of a spline 17 and locked by a nut 18, in an axial direction, against a shoulder of the hub carrier 4 via the taper roller bearings 3.

Since the hub 1 rotates opposite the stationary hub carrier 4, a radial gap 20 results between said parts. Since the end output housing 15 is at least partially filled with lubricant and coolant, a suitable seal must exist which holds back the coolant and lubricant and protects the interior of the end output housing against external influences. A slide ring seal 21 assumes said task. Said slide ring seal 21, of a known construction, consists of a rotating slide ring 22, a first sealing ring 23 inserted in a recess of the hub 1, a stationary counter ring 24 and a second sealing ring 25 inserted in a recess of the hub carrier 4. It is shown in the drawing that the slide ring seal 21 has an effective diameter which is only slightly larger than the external diameter of the taper roller bearings 3.

A hydraulic motor 26 completes the drive device. It is of the essence for the drive device that said hydraulic motor consist of a slow running radial piston engine. The absorption volume of the radial piston engine amounts to approximately 1 180 cm$^3$. The maximum speed is about 310 1/min.

The hydraulic motor is switchable, it being possible for the ratio of the absorption volumes to be $q_{min}/q_{max}=0.33/0.50/0.66$. The brake valves are on the hydraulic motor. The hydraulic circuit is open.

A cylinder block 27 is non-rotatably connected by a spline section 28 with the drive shaft 6. Similar to this, a non-rotatable connection between the cylinder block 27 and the connecting shaft 8 exists via a geometrically equally designed spline section 29.

In a manner known per se, several pistons 30 are radially movably supported in the cylinder block 27. They support themselves via rollers 31 on a stationary cam 32. The hydraulic fluid is supplied and removed by a distributor 33. A housing 34 surrounds the radial piston engine and is, the same as the cam 32, screwed onto the hub carrier 4. For this purpose, several bolt holes 35 are provided in the hub carrier 4.

The connecting shaft 8 is axially movably disposed. On one side, it is under the action of a compression spring 36 and, on the other, a force acts upon it which depends on the pressure prevalent in a pressure chamber 37. In the plotted end position (left) shown of the connecting shaft 8, the pressure prevalent in the pressure chamber 37 is high so that a clamping brake 38 is disengaged. In another case, said clamping brake 38 is engaged by the force of the compression spring 36. The clamping brake 38 acts as parking brake during stand still of the vehicle.

The tumbler drive, explained as having a slow running radial piston engine and a one-stage planetary gear, makes it possible to drive a chain gear at a ratio as high as possible. The tumbler drive is designed with regard to the space requirement-calculated on the hub carrier 4-substantially symmetrically. This means that on one side, the hub 1, the planetary gear 11 and the hydraulic motor 26 are mounted and, on the other side, are rotarily driveably situated. The drive shaft 6 forms the operable connection between the radial piston engine and the planetary gear 11. An essential advantage of said connection is that the diameters of the drive shaft 6 and of the hub carrier 4 can be kept small in the area of said connection. From this it results that the diameters of the taper roller bearings 3 are also small. Accordingly, the radial dimensions of the slide ring seal 21 are also small. Since the peripheral speeds are also relatively low too, on account of the prevailing diameter ratios and of the relatively low speed level, a reliable seal with a long service life results. In addition, the drive device is built compact and is characterized by very smooth running. The planetary gear can work with straight or helical cut gears.

The longitudinal section of a tumbler drive reproduced in FIG. 2, likewise in a simplified representation, has fundamental features in common with the drive device of FIG. 1. Therefore, corresponding parts have been provided with corresponding reference numerals.

When work is to be carried out with separate oil supplies, an additional seal 39, for example, a radial shaft seal, can rotate upon the drive shaft 6. An essential difference from the above explained embodiment consists in that the web 14 of the planetary gear 40 is non-rotatably connected, via the spline 17, with the hub carrier 4. Accordingly, the web 14 in this drive device is not a component part of the end output housing 15. Rather the external central gear 16 is a component part of the hub 1 as an output member of the planetary gear 40. The end output housing 15 is accordingly formed by the hub 1 and an additional lid 41. This modified embodiment can, in particular, be advantageously used when the speed level on the output side is so low that it is possible to renounce to the maximum possible ratio (like in the embodiment of FIG. 1).

Reference numerals
1 hub
2 bolted hole
3 taper roller bearing
4 hub carrier
5 bolted hole
6 drive shaft
7 taper roller bearing
8 connecting shaft
9 separation
10 internal central gear
11 planetary gear
12 planetary gear
13 anti-friction bearing
14 web
15 end output housing
16 external central gear
17 spline
18 nut
19 shoulder
20 gap
21 slide ring seal
22 rotary slide ring
22 rotary slide ring
23 sealing ring
24 stationary counter ring
25 sealing ring
26 hydraulic motor
27 cylinder block
28 spline section
29 spline section
30 piston
31 roller
32 cam
33 distributor
34 housing
35 bolted hole
36 compression spring
37 pressure chamber
38 clamping brake
39 seal
40 planetary gear
41 lid

I claim:

1. A wheel drive for a vehicle consisting of a hydraulic motor (26) which, via a drive shaft (6), actuates an inner central gear (10) of a planetary gear (11, 40) and an output member (web 14 or external central gear 16) which is non-rotatably connected with a hub (1) supported on a stationarily situated hub carrier (4);

wherein said drive shaft (6) is floatingly supported on said hub carrier (4), said hydraulic motor (26) is a slow running radial piston engine and is mounted, in a longitudinal direction of the vehicle, on one side of said hub carrier (4), while said planetary gear (11, 40) and said hub (1) are situated on another side of said hub carrier (4), and a slide ring seal (21) is disposed between said hub carrier (4) and said hub (1).

2. The drive device according to claim 1, wherein said external central gear (16) is non-rotatably connected with said hub carrier (4) and said output member is formed by said web (14) of said planetary gear (11), which is firmly connected by an end output housing (15) with said hub (1).

3. The drive device according to claim 1, wherein said web (14) of said planetary gear (40) is non-rotatably connected with said hub carrier (4), while said output member is formed by said central gear (16) non-rotatably connected with said hub (1).

4. The drive device according to claim 1, wherein said slide ring seal (21) further comprises a rotary slide ring (22), a sealing ring (23) inserted in a recess of said hub (1), a stationary counter ring (24) and a second sealing ring (25) inserted in a recess of said hub carrier (4).

5. The drive device according to claim 1, wherein a clamping brake (38) is coordinated with said hydraulic motor (26).

* * * * *